Jan. 3, 1961   C. N. SMYTH   2,966,795
PRESSURE MEASURING APPARATUS
Filed Oct. 31, 1957
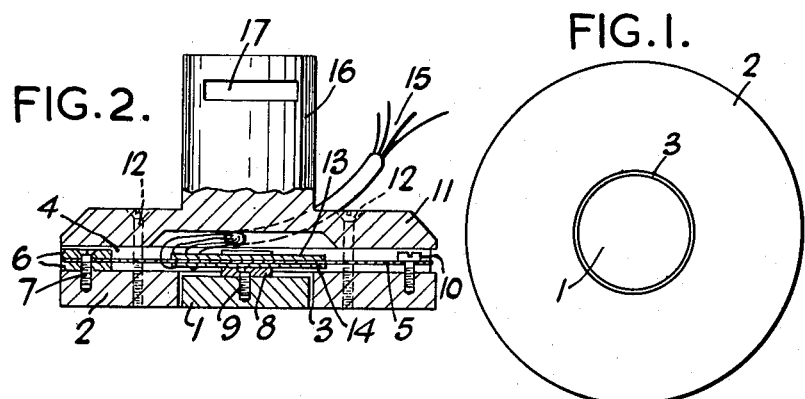
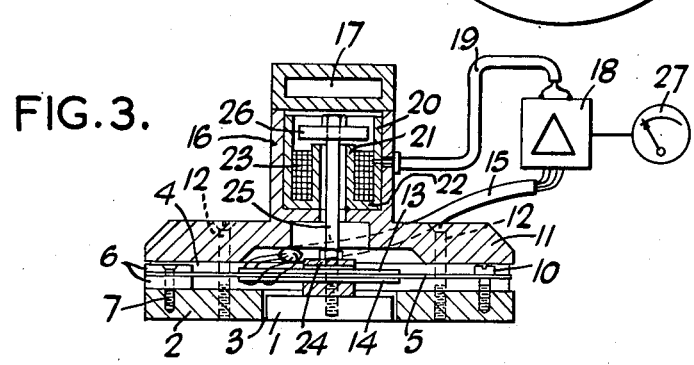
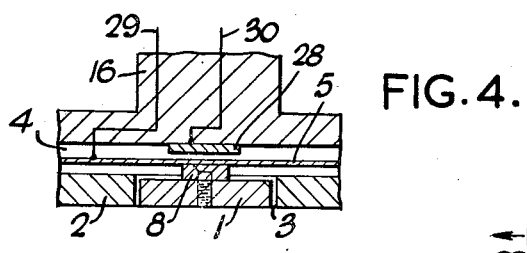
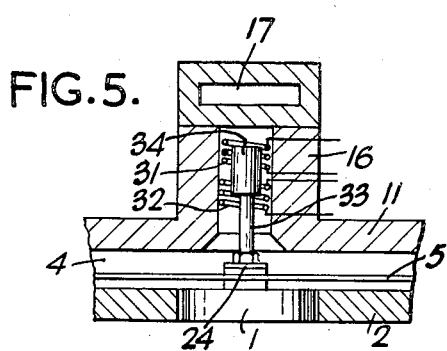
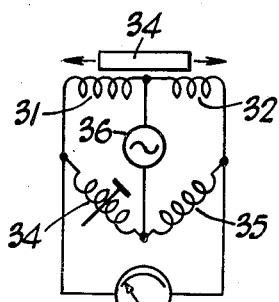
Inventor:
Charles Norman Smyth 2,966,795

PRESSURE MEASURING APPARATUS

Charles Norman Smyth, Hampstead, London, England, assignor to National Research Development Corporation, London, England, a British corporation Filed Oct. 31, 1957, Ser. No. 693,588

Claims priority, application Great Britain Nov. 1, 1956

1 Claim. (Cl. 73—78)

This invention relates to an apparatus for the measurement of the pressure per unit area within a container having a flexible wall.

According to the invention an apparatus is provided for measuring the pressure per unit area within a container having a flexible wall, comprising a flat measuring member which is pressed against the outer surface of the container until the whole of a flat surface of the member is in contact with the said surface of the container and no part of the surface of the member is pressed beyond the level of the surface of the container surrounding the member and means for measuring the force exerted upon the measuring member by the said surface of the container.

The principle of the invention is as follows:

If a pressure is developed inside a container having a flexible wall this pressure produces a tension in the flexible wall causing it to become curved. The relation between internal pressure $P_1$ exerted upon the flexible wall and the external pressure $P_2$ exerted upon the flexible wall may be expressed, in the case of a curved wall, in the form of the equation:

$$P_1 - P_2 = \frac{KT}{R}$$

where K is a constant depending on the curvature of the flexible wall, T is the tension of the flexible wall and R is the radius of curvature.

If R is made infinite, $P_1 = P_2$, and this may be brought about by flattening the wall. If therefore the flexible wall is rendered flat over a certain part of its area by the application of a flat object the pressure per unit area exerted by the flattened part of the flexible wall against the flat object is equal to the pressure per unit area within the container.

The flat object (the measuring member) must not be pressed against the flexible wall with such force that its surface passes beyond the level of the immediately surrounding parts of the flexible wall of the container, or too high a pressure reading will be obtained.

There is, furthermore a possibility of error due to the imperfect flexibility of the flexible wall of the container, which will bend with a finite radius at the margin of the flattened zone. It is therefore preferable to flatten an area immediately surrounding the area flattened by the measuring member so that forces arising from this marginal bending of the flexible wall are not applied to the measuring member.

Further according to the invention therefore there is provided apparatus for measuring the pressure per unit area within a container having a flexible wall, comprising an inner measuring member having one flat surface, an outer-annular member having one annular flat surface, a resilient mounting positioning the inner member within the outer member with the flat surfaces of the two members coplanar when the said mounting is unstressed and means for measuring deflections of the inner member relative to the outer member in directions substantially normal to the said flat surfaces.

The invention will be more readily understood from the following description of certain embodiments thereof designed for the measurement of amniotic pressures in the human embryonic sac, these embodiments being illustrated in the accompanying drawings in which Figure 1 is a plan view of a first embodiment of the invention.

Figure 2 is a sectional elevation of the embodiment shown in Figure 1.

Figure 3 shows a sectional elevation of a second embodiment of the invention.

Figure 4 shows a sectional elevation of a part of a third embodiment of the invention.

Figure 5 shows a sectional elevation of part of a fourth embodiment of the invention, and Figure 6 is a circuit diagram of a measuring circuit for use in conjunction with the embodiment illustrated in Fig. 5.

In Figures 1 and 2 a disc-like measuring member 1 fits within a central aperture in an annular member 2 with an annular clearance space 3 between them. The annular member 2 consists of a flat slab of any convenient material such as an acrylic resin material and a trench or slot 4 is provided in its upper surface to accommodate a supporting spring 5 secured to the floor of the trench 4 at one end between packing pieces such as 6 by means of screws such as 7. The spring 5 extends along the trench 4 passing over the top of the measuring member 1 to which it is secured by means of a saddle 8 which has a threaded extension 9 screwed into the upper surface of the measuring member 1. At the other end of the spring 5 it is restrained against upward movement by means of screws such as 10 which are screwed into the floor of the trench 4 and pass through clearance holes in the spring. The screws 10 are adjusted to bring the lower surfaces of the measuring member 1 and the annular member 2 into the same plane. A cover 11, the lower surface of which is provided with a trench similar to the trench 4 and is relieved in the centre by a circular recess deeper than the trench, is secured over the members 1 and 2 by means of screws 12 indicated in dotted lines so that the trench in the cover member 11 lies over the trench 4 providing clearance for the spring 5 and the screws 6 and 10. Resistance strain gauges 13 and 14 are fixed with an adhesive to the upper and lower surfaces of the spring 5 over a central part thereof somewhat wider than the diameter of the measuring member 1, the saddle 8 being recessed in the centre so that it is clear of contact with the lower strain gauge 14. Wires 15 forming part of the cable are introduced through the wall of the cover member and are connected to the terminals of the two strain gauges. The cover member has a central vertical boss 16 extending upwardly from its upper surface and this may be used as a handle where the apparatus is to be applied manually but a slot 17 is provided at the upper end of the boss 16 so that a band passing through the slot can be used to secure the apparatus to the body of the patient.

The apparatus is applied over the appropriate part of the abdomen and pressed there against with sufficient force to flatten an area of the abdomen which exceeds the area of the under surface of measuring member 1 but should not be pressed so hard that the annular member sinks into the skin around the outer edge of the annular member. As explained previously the force per unit area exerted against the lower surface of the measuring member 1 will, in these circumstances, be equal to the force per unit area within the organs beneath the place where the apparatus is applied which, in the use for which this embodiment was primarily designed, will be the amniotic sac. As the area of the under surface of measuring member 1 is known the total force exerted upon it, divided by this area, will give the pressure per unit area within the amniotic sac. This total force acting on the lower surface of measuring member 1 will slightly deflect the spring, the stiffness of which is chosen so that, over the range of pressures likely to be encountered, the upward movement of the measuring member 1 will be very small; preferably not exceeding 0.004 cm. The bending of the spring 5 will vary the resistance of the strain gauge elements 13 and 14 in opposite senses and this variation of resistance can be measured by any conventional strain gauge indicating technique, the use of two strain gauges in this way enabling a sensitive response to be obtained by balanced bridge methods.

The second embodiment of the invention shown in Figure 3 is similar to the embodiment described in Figures 1 and 2 except that, instead of measuring the deflection of the measuring member 1 and indicating this directly the strain gauges are applied to an amplifier 18, the output of which is an amplified signal varying according to changes of resistance in strain gauges 13 and 14. This amplified output is passed over conductors 19 to a servo-device which applies a force to the measuring member 1 tending to restore it to its normal position in which the lower surfaces of 1 and 2 are coplanar. The restoring device may conveniently be housed within the boss 16 and in the embodiment of Figure 3 takes the form of an electro magnet having concentric hollow cylindrical pole pieces 20 and 21 spaced apart by an annular sole plate 22 so as to leave an annular space between the pole pieces 20 and 21 to accommodate an energising winding 23. The saddle 8 is extended over the top of the spring 5 by means of a bridge piece 24 to the centre of which is attached a rod 25 which passes upwards through the centre of pole piece 21 and has a disc of magnetic material 26 fixed to the top end of it. The disc 26 fits within the pole piece 20, the upper end of which extends above the upper edge of pole piece 21 and is spaced from the rim of 26 to provide a small air gap. When the coil 23 is energised the disc 26 is attracted by the upper edge of the pole piece 21 so as to push the measuring member 1 downwards via the rod 25 and the bridge piece 24. The downward force thus exerted by the measuring member will balance the force exerted upwardly against the measuring member so as to bring it back to its normal position with its lower surface flush with the lower surface of annular member 2 and this downward force may be measured by the connection of a meter 27 to a convenient point in the amplifier. The meter 27 may be calibrated directly in terms of pressure per unit area by applying the apparatus to a flexible container subjected to known internal pressures within the range likely to be encountered.

In the embodiment shown in Figure 4 the apparatus is similar to that shown in Figures 1 and 2 except that, in place of the strain gauges 13 and 14 a condenser sensing arrangement is used. The spring 5, which will in general be made of a metallic substance, forms one plate of a condenser and another plate 28 is attached to the underside of the cover member 11, approximately over the centre of the measuring member 1. Leading wires 29 and 30 are connected to the spring 5 and the plate 28 respectively and when the measuring member 1 is deflected from its normal position there will be a change in the capacity of the condenser formed by spring 5 and plate 28 which can be measured by conventional means, such as the connection of wires 29 and 30 to an electronic oscillator circuit so that the condenser formed by spring 5 and plate 28 forms part of the tuned circuit of the oscillator. The variations of frequency taking place when the measuring member 1 is deflected may be measured by means of a conventional discriminator circuit, the output of which is a variable D.C. voltage which can be applied to a meter calibrated directly in pressure per unit area in the same way as described in relation to Figure 3. A suitable oscillator and discriminator circuit for this purpose are described in United Kingdom patent specification No. 577,538 of James Richard Cornelius entitled "Improved Method of and Means for Making Fine Measurements."

Figure 5 shows another method of indicating deflections of the measuring member 1. Housed in a cavity in the boss 16 are two cylindrical coils 31 and 32 and a rod 33 is attached to the measuring member 1 by means of a bridge piece 24 similar to bridge piece 24 in Figure 3. At the top end of rod 33 there is a ferrite slug 34 which lies within and is symmetrically disposed in relation to the coils 31 and 32. The coils 31 and 32 are connected as adjacent arms in an alternating current bridge circuit which is adjusted so that it is balanced with the ferrite slug 34 in the position corresponding to the normal undeflected position of the measuring member 1. When the measuring member 1 is deflected ferrite slug 34 moves upwards so as to unbalance the bridge whereupon a signal will be obtained across the diagonal points of the bridge opposite to the points at which the alternating current signal is applied. These signals may be measured by a meter connected across the appropriate diagonal of the bridge and the meter may be calibrated in pounds per unit or in the same way as described in Figure 3.

This bridge circuit is diagrammatically illustrated in Fig. 6 where the coils 31 and 32 form two arms of a bridge circuit the other two arms of which are formed by inductances 34 and 35, the former being adjustable for initial balancing of the bridge. A source of alternating current 36 is connected between the junction of 31 and 32 and the junction of 34 and 35 and a measuring instrument 37, which may be a conventional alternating current meter, is connected across the other diagonal of the bridge, namely between the junction of 31 and 34 and the junction of 32 and 35. The measuring instrument 37 may be directly calibrated in pressure per unit area in the same way as described in relation to Fig. 3 or alternatively the dial or the like used for adjusting inductance 34 may be so calibrated, and operated till a nil reading is obtained from 37, in which case initial balancing of the bridge may be carried out by adjusting the dial associated with 34 till balance is obtained and then adjusting the reference mark to coincide with zero on the said dial. Inductances 34 and 35 may be replaced by an exact replica of 31, 32 and 34 for which a dummy cover unit 11, complete with boss 16, coils 31 and 32 and slug 34 may be used, the rod 33 being carried at its lower end in a bridge piece mounted across the lower surface of 11 with provision for screwing the rod 33 upwards and downwards to balance the bridge.

In the embodiments above described the measuring member and annular member have been shown as circular members. It is not of course essential that they should be circular and it may be convenient to use other shapes in specialised applications, for instance where the strength of the tension in the flexible wall of the container is not equal in all directions an elliptical shape for the measuring member may be used.

The invention is not limited to the measurement of amniotic pressures but is applicable to the measurement of pressure developed in man-made containers having a flexible wall of rubber, plastic material or the like such as balloons, motor car tires etc.

I claim:

Apparatus for measuring the pressure per unit area within a container having a flexible wall, comprising an inner measuring member in the form of a disc having one flat surface, an outer annular member having one annular flat surface surrounding said disc member with a minimum working clearance between said two members, a resilient mounting in the form of a strip of resilient material fixed to the two members on the sides of the two members remote from their flat surfaces, for positioning the inner member within the outer member with the flat surfaces of the two members coplanar when said mounting is unstressed, and means, in the form of a strain gauge adapted to measure strains taking place in the said resilient strip, for measuring deflections of the inner member relative to the outer member in directions substantially normal to the said flat surfaces.

References Cited in the file of this patent

UNITED STATES PATENTS

| | | |
|---|---|---|
| 1,875,862 | Fair | Sept. 6, 1932 |
| 2,384,437 | Boynton | Sept. 11, 1945 |
| 2,549,049 | Bierman | Apr. 12, 1951 |
| 2,836,173 | Misao Uemura et al. | May 27, 1958 |
| 2,854,968 | Wright | Oct. 7, 1958 |

FOREIGN PATENTS

| | | |
|---|---|---|
| 4,905 | Great Britain | July 30, 1914 |
| 651,550 | France | Oct. 9, 1928 |
| 295,120 | Switzerland | Feb. 16, 1954 |